US008605121B2

(12) United States Patent
Chu et al.

(10) Patent No.: US 8,605,121 B2
(45) Date of Patent: Dec. 10, 2013

(54) DYNAMIC GAMMA CORRECTION CIRCUIT AND PANEL DISPLAY DEVICE

(75) Inventors: Yi-Nan Chu, Changhua Hsien (TW); Kuan-Hung Liu, Taipei Hsien (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 2085 days.

(21) Appl. No.: 11/163,509

(22) Filed: Oct. 21, 2005

(65) Prior Publication Data

US 2006/0087521 A1 Apr. 27, 2006

(30) Foreign Application Priority Data

Oct. 27, 2004 (TW) ............................... 93132501 A

(51) Int. Cl.
*G09G 5/02* (2006.01)
*G09G 3/30* (2006.01)
*H04N 5/202* (2006.01)

(52) U.S. Cl.
USPC .................. 345/690; 345/77; 34/254; 34/674

(58) Field of Classification Search
USPC ........... 345/88, 89, 94, 95, 99, 100, 204, 207, 345/208, 210, 214, 590, 690, 691, 694, 77; 348/254, 255, 256, 674, 675, 676, 677
See application file for complete search history.

(56) References Cited

U.S. PATENT DOCUMENTS 4,829,381 A * 5/1989 Song et al. .................... 348/674
5,394,195 A * 2/1995 Herman ........................ 348/675
5,461,430 A * 10/1995 Hagerman .................... 348/674
5,710,594 A 1/1998 Kim ............................. 348/254
5,754,150 A 5/1998 Matsui
5,796,384 A 8/1998 Kim ................................ 345/87
5,929,417 A * 7/1999 Hayashi et al. ............... 235/454
6,256,010 B1 7/2001 Chen et al. .................... 345/690
6,462,735 B2 * 10/2002 Naito ............................ 345/204
6,593,934 B1 7/2003 Liaw et al. .................... 345/590
6,633,343 B2 * 10/2003 Ito et al. ........................ 348/674
6,654,028 B1 * 11/2003 Yamakawa .................... 345/690
6,697,127 B2 2/2004 Suzuki .......................... 348/674
6,731,259 B2 * 5/2004 Yer et al. .......................... 345/89
6,778,182 B2 * 8/2004 Yamakawa .................... 345/589
6,788,280 B2 * 9/2004 Ham ................................ 345/89
7,053,881 B2 * 5/2006 Itoh .............................. 345/102

(Continued)

FOREIGN PATENT DOCUMENTS

CN 1523564 8/2004
JP 06-178153 6/1994

(Continued)

*Primary Examiner* — Kent Chang
*Assistant Examiner* — Scott Au
(74) *Attorney, Agent, or Firm* — Jianq Chyun IP Office

(57) ABSTRACT

A dynamic Gamma correction circuit, method thereof and a panel display apparatus are provided. The panel, display apparatus has a timing controller, a dynamic Gamma correction circuit, a display panel and a display driving circuit. The timing controller receives a first image data and then outputs a second image data and a timing control signal. The dynamic Gamma correction circuit receives and analyzes a distribution of gray levels of the first image data so as to dynamically correct and output a plurality of Gamma voltages. The display driving circuit electrically connects to the display panel, the timing controller and the dynamic Gamma correction circuit for receiving the second image data and the Gamma voltage so as to drive the display panel according to the timing control signal.

8 Claims, 5 Drawing Sheets

(56) References Cited

U.S. PATENT DOCUMENTS

| | | | | |
|---|---|---|---|---|
| 7,317,460 | B2 * | 1/2008 | Kim et al. | 345/690 |
| 7,339,565 | B2 * | 3/2008 | Kim | 345/88 |
| 7,522,135 | B2 * | 4/2009 | Baik | 345/88 |
| 2002/0036716 | A1 | 3/2002 | Ito et al. | 348/674 |
| 2002/0063666 | A1 * | 5/2002 | Kang et al. | 345/87 |
| 2003/0067435 | A1 * | 4/2003 | Liu | 345/101 |
| 2003/0169248 | A1 * | 9/2003 | Kim et al. | 345/204 |

FOREIGN PATENT DOCUMENTS

| | | |
|---|---|---|
| JP | 08-023460 | 1/1996 |
| JP | 09-012790 | 1/1997 |
| JP | 2001-333296 | 11/2001 |
| JP | 2002-158894 | 5/2002 |
| TW | 559767 | 11/2003 |

* cited by examiner

DYNAMIC GAMMA CORRECTION CIRCUIT AND PANEL DISPLAY DEVICE

CROSS-REFERENCE TO RELATED APPLICATION

This application claims the priority benefit of Taiwan application serial no. 931 32501, filed on Oct. 27, 2004. All disclosure of the Taiwan application is incorporated herein by reference.

BACKGROUND OF THE INVENTION

1. Field of the Invention

The present invention relates to an apparatus and a method for generating a Gamma voltage, and more particularly to an apparatus and a method for dynamically correcting a Gamma voltage.

2. Description of Related Art

Image devices have been widely used in different products. For these image devices, Gamma generators usually are used in internal circuits thereof. For example, when liquid crystals are driven to display image on a liquid crystal display, a driving voltage should be applied so as to tilt the liquid crystals for a desired angle. Usually, the driving voltage is controlled by image signals, e.g. digital signals. The relationship among the image signals, the driving voltage, the tilt angle of the liquid crystals and pixel transparence are not lineal. Therefore, Gamma generators are required to correct the driving voltages, i.e. the Gamma curve, of the image signals.

FIG. 1 is a circuit block diagram showing a prior art liquid crystal display. Referring to FIG. 1, the prior art circuit comprises a timing controller 110, a Gamma generator 120, a display driving circuit 130 and a liquid crystal display 140. The timing controller 110 receives the image data 101, and then outputs the image data 111 and the timing control signal 112. The Gamma generator 120 provides Gamma voltages 121 corresponding to different gray levels. The display driving circuit 130 comprises a data-line driver 131 and a scan-line driver 132. The scan-line driver 132 generates driving signals according to the timing control signal 112 so as to drive scan lines of the liquid crystal display panel 140. The data-line driver 131 locks the image data 111 according to the timing control signal 112. The data-line driver 131 selects and outputs a Gamma voltage corresponding thereto so as to drive the data lines of the liquid crystal display 140.

Generally, a series of resistors are used to divide the voltage to generate the Gamma voltages. It means that the Gamma voltages are fixed and cannot be changed. If the Gamma voltages or the Gamma curves are fixed, it is difficult to distinguish the contrast of different darkness when the image tends to be slightly darker. Likewise, it is difficult to distinguish the contrast of different brightness when the image tends to slightly brighter. This phenomenon will adversely affect the image quality.

SUMMARY OF THE INVENTION

Accordingly, the present invention is directed to a panel display apparatus capable of improving image display quality according to the dynamic Gamma correction voltages of the image data.

The present invention is directed to a dynamic Gamma correction circuit for analyzing the image data so as to correct and output a plurality of Gamma voltages according to the analyzed result.

The present invention is also directed to a dynamic Gamma correction for analyzing the gray-level distribution of the image data and providing a plurality of Gamma voltage levels according to the analyzed result.

The present invention provides a panel display apparatus comprising a timing controller, a dynamic Gamma correction circuit, a display panel and a display driving circuit. The timing controller receives a first image data and then outputs a second image data and a timing control signal, wherein the second image data is, for example, the data of the previous frame of the first image data. The dynamic Gamma correction circuit receives and analyzes a distribution of gray levels of the first image data so as to dynamically correct and output a plurality of Gamma voltages. The display panel displays images. The display driving circuit is electrically connected to the display panel, the timing controller and the dynamic Gamma correction circuit, and is adapted for receiving the second image data and the Gamma voltages so as to drive the display panel according to the timing control signal.

The present invention also provides a dynamic Gamma correction circuit including a gray-level analyzer, a gray-level adjuster and a Gamma voltage generator. The gray-level analyzer receives and analyzes a distribution of gray levels of the first image data so as to output an analyzed result. The gray-level adjuster is electrically connected to the gray-level analyzer, and is adapted for determining a plurality of gains corresponding to the Gamma voltages so as to output a plurality of control signals according to the analyzed result and a standard value. The Gamma voltage generator is electrically connected to and controlled by the gray-level adjuster, and is adapted for outputting the Gamma voltages according to the control signals.

According to an embodiment of the present invention, when the gray-level analyzer receives the first image data, the gray-level analyzer divides a gray-level range of a frame of the first image data into a plurality of gray-level zones, and classifies the gray levels of the frame of the first image data corresponding to the gray-level zones so as to generate accumulations of the gray-level zones which are the analyzed result.

The present invention also provides a dynamic Gamma correction method for dynamically correcting and generating a plurality of Gamma voltages. The dynamic Gamma correction method comprises the following steps of providing a gray-level analyzer to analyze a distribution of gray levels of an image data so as to obtain an analyzed result; providing a gray-level adjuster to determine a plurality of gains corresponding to the Gamma voltages so as to obtain a plurality of control signals according to the analyzed result and a standard value; and providing a Gamma voltage generator to generate the Gamma voltages according to the control signals.

According to an embodiment of the present invention, the gray-level distribution of the image data is analyzed. According to the analyzed result, a plurality of Gamma voltages is corrected and outputted. Accordingly, the Gamma voltages, i.e. Gamma curves, are dynamically corrected according to the image data. In other words, when the image tends to be too dark, the Gamma voltages are dynamically corrected so as to enhance the contrast of different darkness. When the image tends to be too bright, the Gamma voltages are dynamically corrected so as to enhance the contrast of different brightness. Accordingly, the image quality can be effectively improved.

The above and other features of the present invention will be better understood from the following detailed description of the preferred embodiments of the invention that is provided in communication with the accompanying drawings.

DESCRIPTION OF EMBODIMENTS

Figure 1:
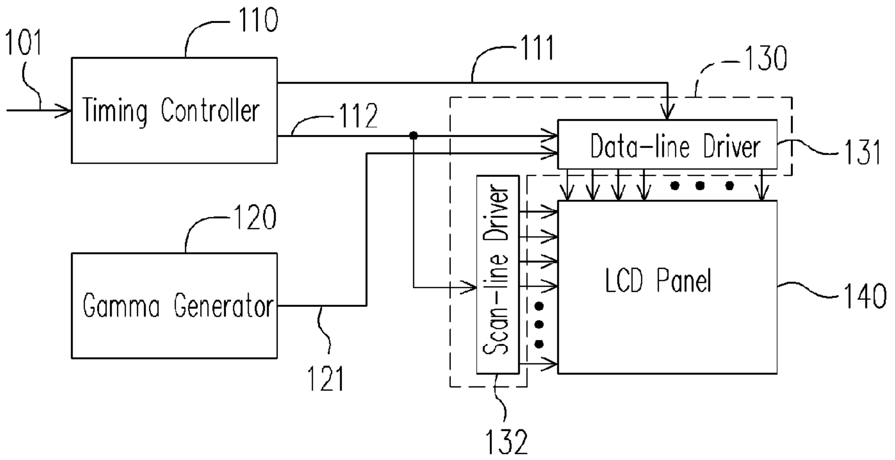
FIG. 1 (PRIOR ART)
FIG. 1 is a circuit block diagram showing a prior art liquid crystal display.
Figure 2:
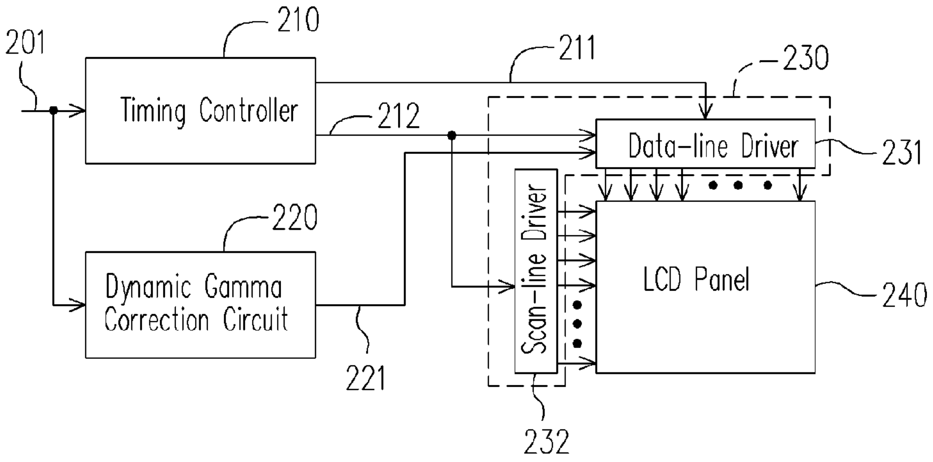
FIG. 2 is a schematic circuit block diagram showing a liquid crystal display according to an embodiment of the present invention.

In order to describe the present invention, following are the descriptions of a liquid crystal display of the present invention. FIG. 2 is a schematic circuit block diagram showing a liquid crystal display according to an embodiment of the present invention. Referring to FIG. 2, the apparatus comprises a timing controller 210, a dynamic Gamma correction circuit 220, a display driving circuit 230 and a display panel 240. The timing controller 210 receives a first image data 201, and outputs a second image data 211 and a timing control signal 212. Herein, the second image data 211 is, for example, the data of the previous frame of the first image data 201. The dynamic Gamma correction circuit 220 receives and analyzes the first image data 201 so as to dynamically correct and output Gamma voltages 221 corresponding to different gray levels.

The display driving circuit 230 comprises, for example, a data-line driver 231 and a scan-line driver 232. The scan-line driver 232 generates driving signals according to the timing control signal 212 so as to drive scan lines of the liquid crystal display panel 240. The data-line driver 231 locks the second image data 211 according to the timing control signal 212. The data-line driver 231 selects and outputs one of the Gamma voltages 221 corresponding to the second image data 211 so as to drive the data lines of the liquid crystal display 240.

Figure 3:
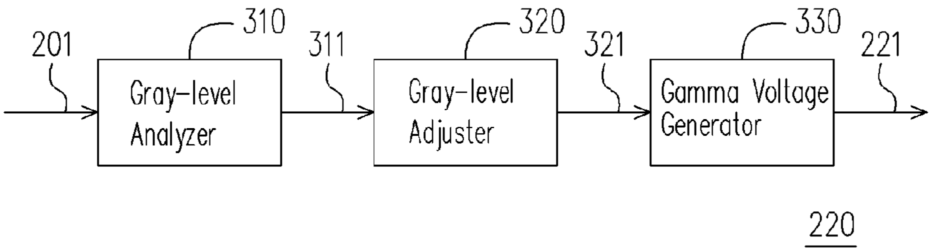
FIG. 3 is schematic circuit block diagram showing a dynamic Gamma correction circuit according to an embodiment of the present invention.

Following are the descriptions of the dynamic Gamma correction circuit 220. FIG. 3 is a schematic circuit block diagram showing a dynamic Gamma correction circuit according to an embodiment of the present invention. Referring to FIG. 3, the dynamic gamma correction circuit 220 comprises a gray-level analyzer 310, a gray-level adjuster 320 and a Gamma voltage generator 330.

Figure 4A:
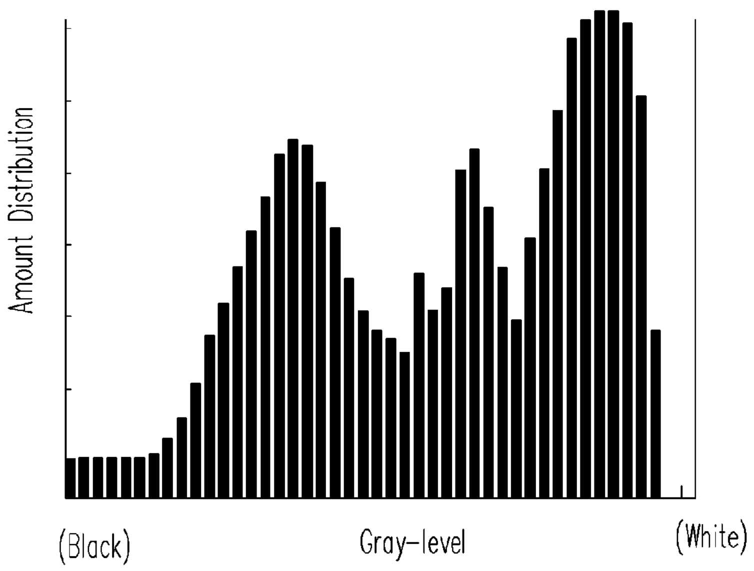
FIGS. 4A-4C are gray-level distributions of a light image, a normal image and a dark image.
Figure 4B:
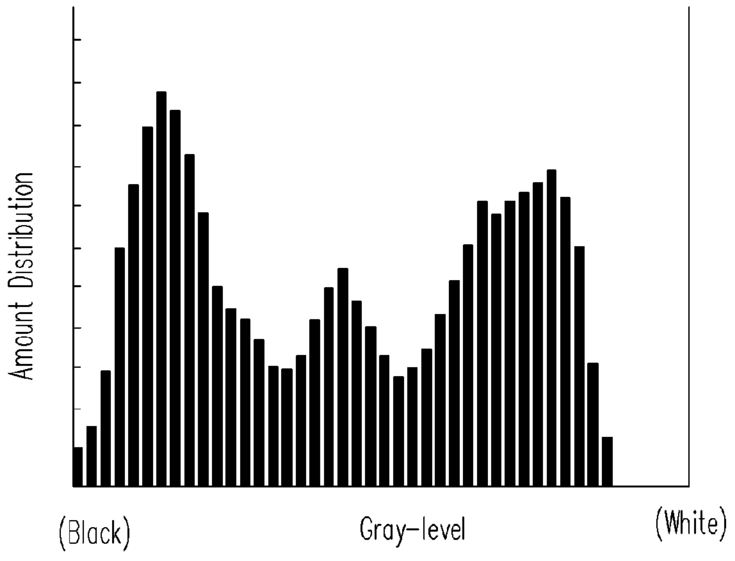
Figure 4C:
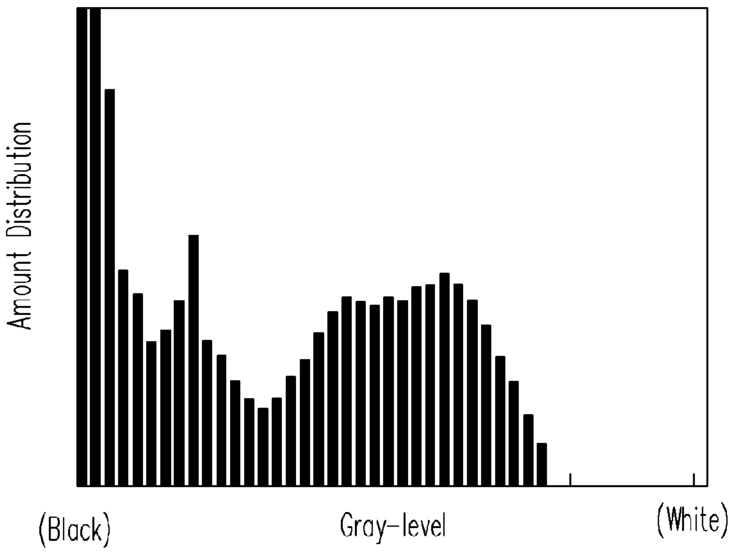

The gray-level analyzer analyzes the input data, i.e. the image data 201. According to the image data 201, the gray-level analyzer 310 analyzes the distribution of the whole image data by a data-statistic method. FIGS. 4A-4C illustrates gray-level distributions of a bright image, a normal image and a dark image. The horizontal axis represents gray level; the vertical axis represents amount. FIG. 4B is the gray-level distribution of a normal image in which the gray levels of the present image are evenly distributed. Compared with FIG. 4B, FIG. 4A shows a bright image, and FIG. 4C shows a dark image. The gray-level analyzer 310 analyzes the gray-level distribution of the frame and outputs the analyzed result 311.

Figure 4D:
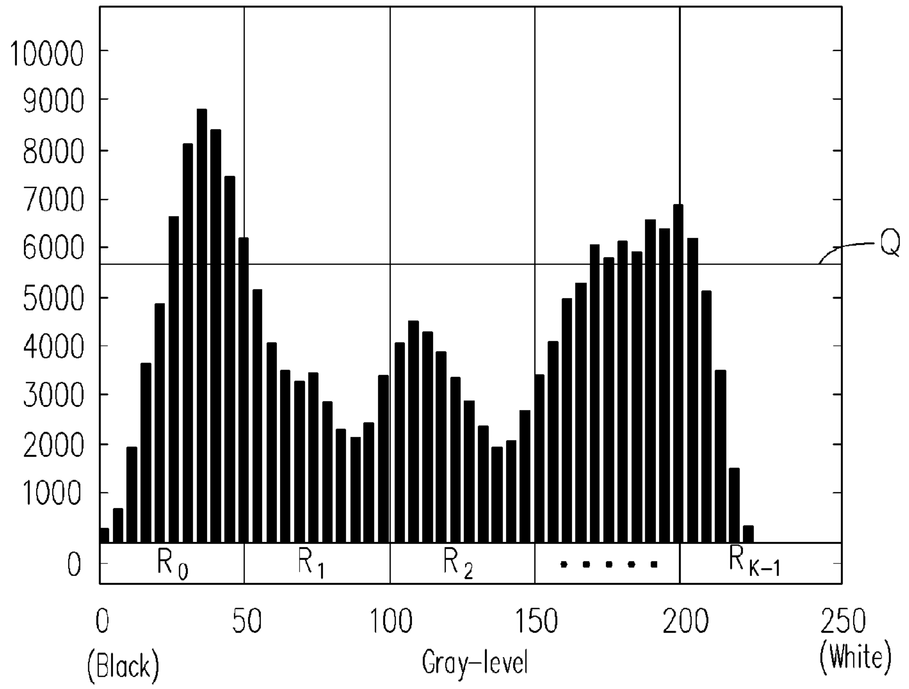
FIG. 4D. is a gray-level distribution of an image data according to an embodiment of the present invention.

In order to clearly describe the gray-level analyzer 310 according to an embodiment of the present invention, another gray-level distribution configuration is provided. Referring to FIG. 4D, the horizontal axis represents gray level; the vertical axis represents amount. It is assumed that the gray-level analyzer 310 receives T-pixel data during a frame period. It is also assumed that each of the image data has 8 bits. Accordingly, the gray-level analyzer 310 can define 256 gray levels. This embodiment also defines a standard value Q. The standard value Q is equal to the total data number divided by the total gray levels, i.e. T/256.

The gray-level range is divided into k zones, $R_0$~$R_{k-1}$. The gray-level analyzer 310 classifies the gray levels of the image data corresponding to the gray zones. After a whole frame is analyzed, the accumulations of the gray levels in different gray-level zones $R_0$~$R_{k-1}$ are thus obtained.

After the gray-level analyzer 310 finishes the gray-level distribution of the last frame, the accumulations in different gray-level zones $R_0$~$R_{k-1}$ are transmitted to the gray-level adjuster 320. According to the distribution of the gray levels, the gray-level adjuster 320 outputs control signals 321. The control signals 321 may, for example, determine the gains of the Gamma voltages outputted from the Gamma voltage generator 330. For example, when an accumulation of a gray-level zone is larger than the standard value Q, the gain parameter, i.e. the control signal 321, is transmitted to control the Gamma voltage generator 330 so as to increase the Gamma voltage gain corresponding to the gray-level zone. When an accumulation of a gray-level zone is smaller than the standard value Q, the gain parameter, i.e. the control signal 321, is transmitted to control the Gamma voltage generator 330 so as to reduce the Gamma voltage gain corresponding to the gray-level zone. The gain parameter enhances the contrast of the Gamma brightness of the dark image or bright image so as to improve the image quality.

The Gamma voltage generator 330 corrects and outputs the Gamma voltages 221 according to the control signals 321. In this embodiment, the Gamma voltage generator 330 is EL5825 provided by INTERSIL Co. The detailed descriptions of EL5825 are mentioned in the data sheet provided by INTERSIL Co. Detailed descriptions are not repeated. By controlling the Gamma voltage generator 330 with the control signals 321, the Gamma voltages corresponding to the gray levels can be corrected.

Figure 5:
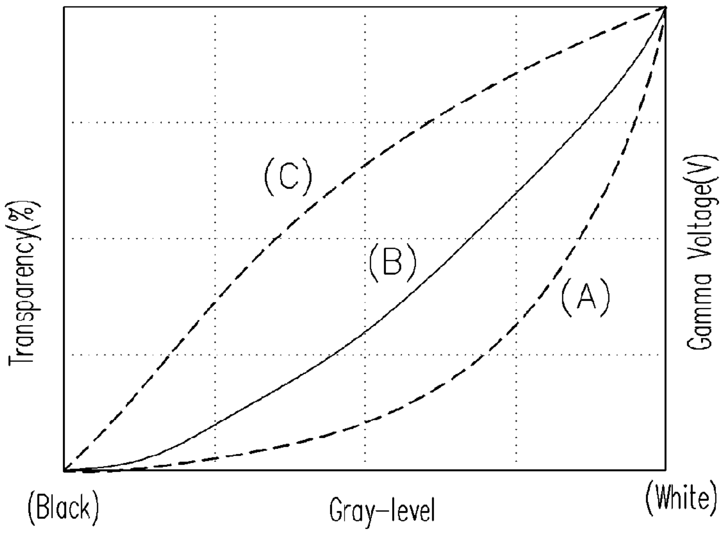
FIG. 5 is a Gamma curve according to an embodiment of the present invention.

FIG. 5 shows a Gamma curve according to an embodiment of the present invention. The horizontal axis represents the gray levels of the image data. The vertical axis represents the transparency of the display panel 240. The vertical axis may also represent the Gamma voltage. Referring to FIG. 5, the curve B represents a Gamma curve with a normal gray-level distribution of an image data. When the image data of the present frame is slightly dark, the Gamma voltage generator 330 is controlled so as to dynamically correct the Gamma voltage level. Accordingly, the Gamma curve B is corrected towards the curve A. When the image data of the present frame is slightly bright, the Gamma voltage generator 330 is controlled so as to dynamically correct the Gamma voltage level. Accordingly, the Gamma curve B is corrected towards to the curve C. The corrected Gamma voltage can be used for the display of the next frame. The Gamma voltages are dynamically corrected so as to enhance the contrast of the dark image or bright image and to improve the image quality.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

What is claimed is:

1. A panel display apparatus, comprising:

a timing controller, for receiving an input image data, so as to obtain a current frame data, a previous frame data and a timing control signal;

a display panel, for displaying images corresponding to the previous frame data and the current frame data;

a dynamic Gamma correction circuit, for providing a plurality of uncorrected Gamma voltages during the display panel displays the image corresponding to the previous frame data, and further for analyzing a distribution of all of gray levels of the previous frame data so as to provide a plurality of corrected Gamma voltages during the display panel displays the image corresponding to the current frame data;

a scan-line driver, electrically connected to the timing controller and the display panel, for generating a plurality of driving signals according to the timing control signal so as to sequentially drive a plurality of scan lines of the display panel; and a data-line driver, electrically connected to the timing controller, the display panel and the dynamic Gamma correction circuit, for receiving the uncorrected or corrected Gamma voltages, the previous or the current frame data and the timing control signal, and for locking the previous frame data according to the timing control signal, and selecting and outputting the uncorrected Gamma voltages corresponding to all of the gray levels of the locked previous frame data, so as to drive a plurality of data lines of the display panel and thus making the display panel display the image corresponding to the previous frame data, and further for locking the current frame data according to the timing control signal, and selecting and outputting the corrected Gamma voltages corresponding to all of gray levels of the locked current frame data, so as to drive the plurality of data lines of the display panel and thus making the display panel display the image corresponding to the current frame data, wherein the uncorrected Gamma voltages are corresponding to a first Gamma curve; the corrected Gamma voltages are corresponding to a second Gamma curve: and the first and the second Gamma curves are different.

2. The panel display apparatus of claim 1, wherein the dynamic Gamma correction circuit comprises:

a gray-level analyzer, for receiving the previous frame data and analyzing the distribution of all of the gray levels of the previous frame data so as to output an analyzed result, wherein when the gray-level analyzer receives the previous frame data, the gray-level analyzer divides a gray-level range of the previous frame data into a plurality of gray-level zones, and classifies all of the gray levels of the previous frame data corresponding to the gray-level zones so as to generate accumulations of the gray-level zones which are the analyzed result;

a gray-level adjuster, electrically connected to the gray-level analyzer, for determining a plurality of gains corresponding to the corrected Gamma voltages so as to output a plurality of control signals according to the analyzed result and a standard value; and a Gamma voltage generator, electrically connected to and controlled by the gray-level adjuster, for outputting the uncorrected Gamma voltage during the display panel displays the image corresponding to the previous frame data, and further for outputting the corrected Gamma voltages according to the control signals during the display panel displays the image corresponding to the current frame data.

3. The panel display apparatus of claim 2, wherein the gray-level analyzer analyzes the distribution of all of the gray levels of the previous frame data by a data-statistic method.

4. The panel display apparatus of claim 1, wherein the display panel is a liquid crystal display panel.

5. A dynamic Gamma correction circuit, for providing a plurality of uncorrected or corrected Gamma voltages to a data-line driver of a panel display apparatus, the dynamic Gamma correction circuit comprising:

a gray-level analyzer, for receiving a previous frame data and analyzing a distribution of all of gray levels of the previous frame data so as to output an analyzed result, wherein when the gray-level analyzer receives the previous frame data, the gray-level analyzer divides a gray-level range of the previous frame data into a plurality of gray-level zones, and classifies all of the gray levels of the previous frame data corresponding to the gray-level zones so as to generate accumulations of the gray-level zones which are the analyzed result;

a gray-level adjuster, electrically connected to the gray-level analyzer, for determining a plurality of gains corresponding to the corrected Gamma voltages so as to output a plurality of control signals according to the analyzed result and a standard value; and a Gamma voltage generator, electrically connected to and controlled by the gray-level adjuster, for outputting the uncorrected Gamma voltage during a display panel displays an image corresponding to the previous frame data, and further for outputting the corrected Gamma voltages according to the control signals during the display panel displays an image corresponding to a current frame data, wherein the uncorrected Gamma voltages are corresponding to a first Gamma curve; the corrected Gamma voltages are corresponding to a second Gamma curve; and the first and the second Gamma curves are different.

6. The dynamic Gamma correction circuit of claim 5, wherein the gray-level analyzer analyzes the distribution of all of the gray levels of the previous frame data by a data-statistic method.

7. The panel display apparatus of claim 3, wherein the standard value is equal to a total pixel data number of previous frame data divided by a total gray-level number.

8. The dynamic Gamma correction circuit of claim 6, wherein the standard value is equal to a total pixel data number of previous frame data divided by a total gray-level number.

* * * * *